United States Patent [19]

Emery et al.

[11] Patent Number: 4,852,236
[45] Date of Patent: Aug. 1, 1989

[54] METHOD OF REPAIRING A WORN WOBBLER HOUSING FOR A CONSTANT-SPEED DRIVE

[75] Inventors: Leo D. Emery, Banner Elk, N.C.; Meryl Taulbee, Deerfield Beach, Fla.

[73] Assignee: Emery Corporation, Deerfield Beach, Fla.

[21] Appl. No.: 217,466

[22] Filed: Jul. 11, 1988

[51] Int. Cl.$^4$ .............................................. B23P 6/00
[52] U.S. Cl. ............................. 29/402.11; 29/402.06; 29/402.08; 29/402.01; 29/402.04; 74/800
[58] Field of Search .......... 29/402.06, 402.08, 402.18, 29/402.11, 402.01, 402.02, 402.04, 402.05; 74/800

[56] References Cited

U.S. PATENT DOCUMENTS

| | | | |
|---|---|---|---|
| 595,968 | 12/1897 | Parsons | 74/800 |
| 3,306,134 | 2/1967 | Winiarski | 74/800 |
| 4,050,140 | 9/1977 | Newell | 29/402.06 X |
| 4,366,726 | 1/1983 | Nilsson | 74/800 |
| 4,433,596 | 2/1984 | Scalzo | 74/800 X |
| 4,563,915 | 1/1986 | Tibbals, Jr. | 74/800 |
| 4,574,449 | 3/1986 | Wussow | 29/402.06 |
| 4,715,249 | 12/1987 | Tibbals, Jr. | 74/800 |
| 4,742,729 | 5/1988 | Cordara | 74/800 X |

FOREIGN PATENT DOCUMENTS

| | | | |
|---|---|---|---|
| 5566 | 11/1979 | European Pat. Off. | 74/800 |
| 65348 | 4/1983 | Japan | 74/800 |

Primary Examiner—Timothy V. Eley
Assistant Examiner—Peter D. Vo
Attorney, Agent, or Firm—Dykema Gossett

[57] ABSTRACT

The method of repairing a variable wobbler body for a constant-speed drive, rotatable upon a first axis wherein the normally flat control face has become worn and irregular in shape, and the axial bore and tapered clearance opening upon a second axis is out of round, comprising the steps of cutting the worn surface areas of the wobbler body, drilling a bore of increased diameter through the axial bore and clearance opening, making a wear plate insert including a body with a replacement flat control surface, a cylindrical shank having a bore terminating in an outwardly diverging clearance opening, press-fitting the wear plate into the cut out machined areas, lapping the wear control face to a flatness of 0.000050 inches, approximately with a finish of 8 RMS. The invention further includes a wobbler body having a pair of aligned journals rotatable upon a first axis, a bottom flat seat in the plane parallel to the first axis, and a cylindrical bore upon a second axis at right angles to the first axis. A preformed wear plate insert has a body, a flat annular control wear surface, and a cylindrical shank having a bore terminating in an annular outwardly diverging clearance opening, the wear plate being nested within a recessed portion of the wobbler body and secured thereto.

16 Claims, 2 Drawing Sheets

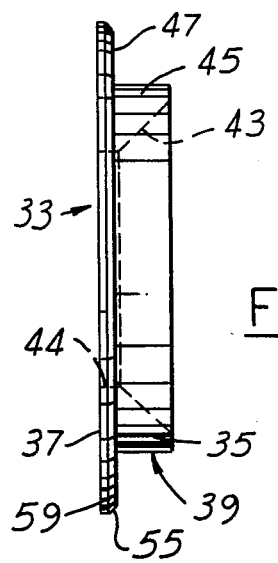
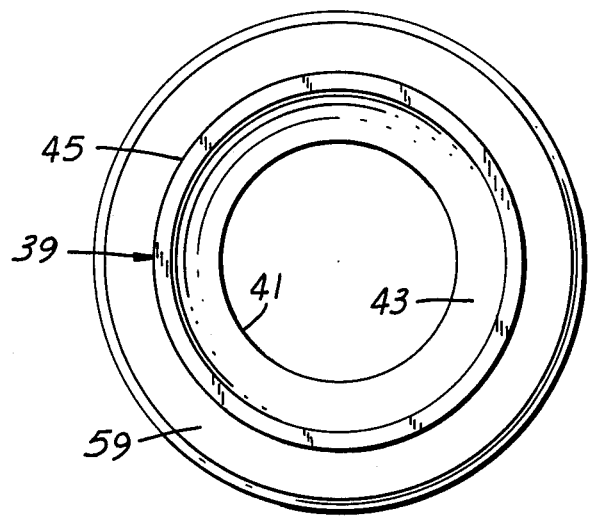
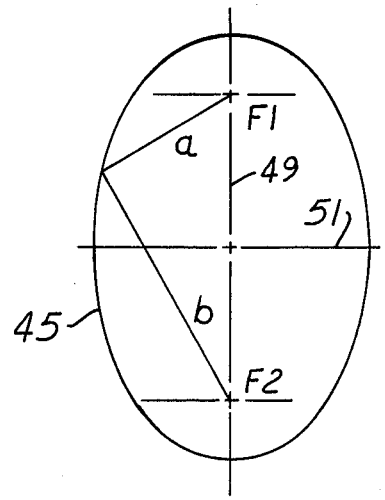
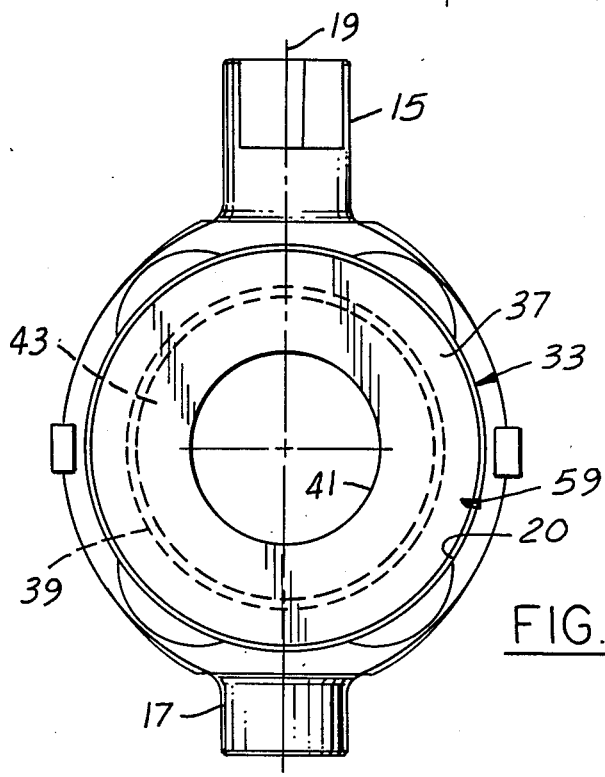
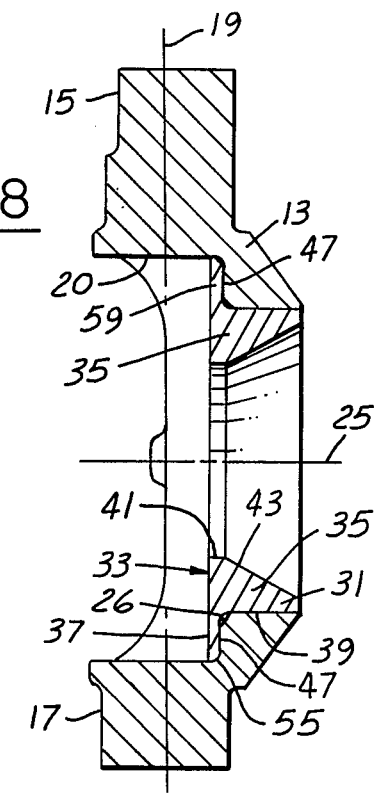

METHOD OF REPAIRING A WORN WOBBLER HOUSING FOR A CONSTANT-SPEED DRIVE

FIELD OF INVENTION

The present invention relates to wobblers used in cosntant-speed drives. Such a wobbler has a normally flat control face which can become worn and irregular in shape and an axial bore and tapered shaft clearance opening which can also become worn and out of round.

BACKGROUND OF THE INVENTION

Wobblers have been used in industry and in equipment, machines and motors for providing a constant drive speed for a shaft during variations in the speed of rotation of the power delivered to the wobbler housing. Critical to many wobbler constructions in the use of a perfectly flat control surface or face which after much use becomes worn and irregular in shape and wherein the axial bore and tapered shaft clearance opening therein, normally located upon a second axis, have become worn or out of round, normally requiring replacement of the wobbler housing or the repair thereof.

Previously, in the use of wobblers, and in particular a wobbler housing employing a perfectly flat control surface, it is essential to the operation thereof that the control surface be flat at all times since wear and irregularities in the control surface have an adverse effect upon the control speed of rotation of a drive shaft normally extending through the wobbler housing.

SUMMARY OF THE INVENTION

An important feature of the present invention is to provide a method of repairing a wobbler housing after the normally flat control face has been worn and become irregular to such an extent that such surface must be replaced in accordance with the use of a preformed wear plate inserted and secured within the wobbler housing once the wobbler housing has been machine-ground to eliminate the worn and irregular surfaces therein.

Another feature of the present invention includes a series of steps for preparing the worn surfaces of the wobbler housing and grinding away defective portions thereof such that a replacement wear plate may be inserted and secured therein which returns the wobbler housing to its initial fully efficient shape, including a bottom perfectly flat control surface and with an axial bore and tapered shaft clearance opening therein.

As another feature, the present method includes the steps of grinding the worn bottom control face of the wobbler housing in a plane parallel to a first axis upon which the housing is rotatable to a uniform depth; turning the ground bottom control face to a preset dimension; and drilling a cylindrical bore in the wobbler housing upon a second axis at right angles to the first axis to a predetermined diameter which removes from the initial wobbler housing its original bore and tapered clearance surface.

As another feature, the present method includes the additional steps of grinding the cylindrical bore to an irregular shape such as elliptical, for illustration, and thereafter taking a preformed wear plate having a body, a flat control wear face with a flat undersurface, a cylindrical shank, a bore and a clearance taper and successively forming the exterior surface of the shank to a corresponding irregular or elliptical shape and thereafter inserting the wear plate body into the machined wobbler housing with the irregular or elliptical surfaces in registry and with the wear face undersurface of the body bearing against the machined bottom face of the wobbler housing.

As another feature, the present method includes the step of grinding the cylindrical bore of the wobbler housing to an irregular shape such as elliptical and forming a corresponding exterior surface upon the shanks so as to prevent rotation of the wear plate body with respect to the wobbler housing upon assembly thereof.

As another feature, the present method includes the additional step of anchoring or securing the wear plate body within the wobbler housing. This is accomplished in the illustrative embodiment by heating a wobbler housing to about 200 degrees F., and press-fitting the wear plate body into the wobbler housing for a shrink fit and anchorage therein upon cooling of the wobbler housing.

Another important feature includes in the present method the step of further grinding the bottom control face to a final predetermined dimension for a preset flatness and surface finish.

Another important feature includes the additional step of surface-tempering the wobbler housing by baking it in an oven at 395 degrees F., approximately, plus or minus 10 degrees F., for a period of about four hours.

Still another feature of the present method is to machine and drill the worn wobbler housing, removing metal therefrom corresponding to the wear and irregularities therein such that the replacement preformed wear plate, when inserted and secured within the wobbler housing, replaces all of the machine-removed metal, returning the wobbler housing to its original dimensions with particular reference to a perfectly flat control face thereon.

Another important feature includes the additional step of grinding the control wear face of the wear plate body flat within 0.0001 inch TIR (true indicated reading), with a surface finish of 16 RMS (micro finish).

As another feature, the previously ground control wear face is further finish lapped to a flatness of 0.000050 inches, approximately, with a surface finish of 8 RMS, approximately.

Still another feature of the present invention is to include in the method the step of coating the pre-manufactured replacement wear plate with a thin, consistent film of a sealant, such as Loc-Tite 620 ™, on all internal mating surfaces thereof and allowing the sealant to cure thereon.

As another feature of the present invention, there is provided a wobbler for a constant-speed drive which comprises a recessed housing having a pair of aligned journals rotatable upon a first axis and having a flat bottom annular seat lying in a plane parallel to the first axis and with the seat terminating in a cylinder bore within the housing upon a second axis at right angles to the first axis.

As another feature of the present invention, there is provided a preformed wear plate having a body, a flat annular control wear face with a flat undersurface, a cylindrical shank and a bore terminating in an annular diverging clearance taper wherein the wear plate body is nested and secured within recessed portions of the wobbler housing with the flat undersurface of the wear plate body bearing against the seat of the housing. In such a construction, the flat annular wear face of the wear plate body provides a control surface for the wobbler housing, and the shank is nested within the housing bore.

These and other features and objects will be seen from the following specification and claims in conjunction with the appended drawings.

THE DRAWINGS

FIG. 5 is a side elevational view of the preformed wear plate.

FIG. 6 is a front elevational view of the preformed wear plate of FIG. 5.

FIG. 7 is an end view of the wear plate shank after the step of forming its annular surface to an elliptical shape, shown exaggerated, corresponding to FIG. 3.

FIG. 8 is a vertical section of the wobbler housing as machined in accordance with FIG. 2 and with the wear plate shown in FIGS. 5 and 6 inserted and secured therein in accordance with the present method.

FIG. 9 is a side elevational view of the combined wobbler housing and wear plate of FIG. 8.

It will be understood that the above drawings illustrate merely preferred embodiments of the steps of the present method and wobbler for a constant-speed drive which has been machined and repaired in accordance with the steps of the present method, and that other steps are contemplated within the scope of the claims hereafter set forth.

DETAILED DESCRIPTION OF AN EMBODIMENT OF THE INVENTION

Figure 1:
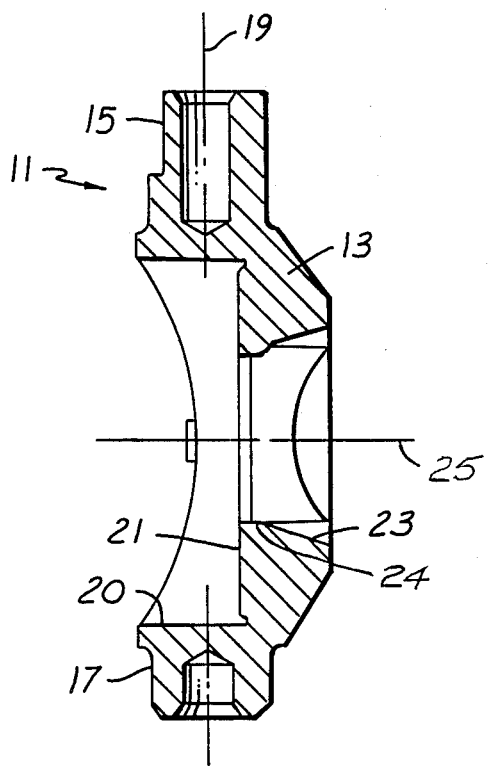
FIG. 1 is an elevational section of a wobbler housing ready for use having a perfectly flat control face, an axial bore and a tapered shaft clearance opening.

A conventional wobbler for providing a constant-speed drive is indicated at 11 in FIG. 1, which includes a housing 13 and a pair of spaced aligned journals 15 and 17 adapted for mounting upon a longitudinal axis 19 for limited rotation thereon. Housing 13 includes recessed bore 20 terminating at its lower end in the normally flat or perfectly flat bottom control face 21 which lies in a plane parallel to axis 19.

In the foregoing wobbler housing 13, there is further provided the bore 24 which terminates the upwardly diverging clearance opening 23 through which normally projects a conventional driven shaft, not shown in the illustrative embodiment. Bore 24 and the corresponding tapered clearance opening 23 are arranged upon a second axis 25 extending at right angles to the first axis 19.

In the continued use of the basic wobbler shown in FIG. 1, the normally flat control face 21 becomes worn and irregular in shape. Further, the axial bore 24 and the tapered shaft clearance opening 23 becomes worn and out of round, normally necessitating replacement of the wobbler.

In accordance with the present method illustrated in connection with FIGS. 2–8, when the surfaces 21, 23 and 24 become worn they are machined or ground away to predetermined dimensions, and a preformed wear plate 33, FIG. 5, is assembled therein as in FIG. 8. Surfaces on wear plate 33 corresponding to original surfaces 21, 23 and 24 in their unworn state and thus return the wobbler housing to its original unworn shape shown in FIG. 1.

Figure 2:
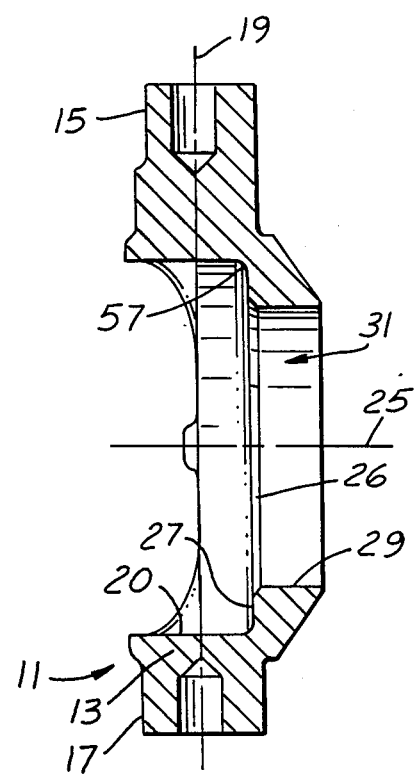
FIG. 2 is a vertical section of the wobbler housing shown in FIG. 1 after it has been machined in accordance with some of the steps of the present invention, on an increased scale.

FIG. 2 is illustrative of some of the steps of repairing the wobbler housing 13, wherein the worn and irregular control surface 21 of FIG. 1 has initially been ground at 27, to a uniform depth within the bore 20.

As a further step, the worn control surface 21 of FIG. 1 is further machined by turning the ground bottom control face to a preset dimension as shown at 27, FIG. 2, and thereafter drilling a cylindrical bore 29 in the wobbler housing 13. Bore 29 is located upon the second axis 25 which extends at right angles to the first axis 19. The step of drilling the cylindrical bore 29 includes removal of such metal that formed original bore 24 and opening 23 from the original housing 13, FIG. 1, eliminates the initial bore 24 and tapered clearance surface 23. An intermediate step following the formation of the bore 29 within the housing 13 is the formation of the annular chamfer 26 at the inside annular corner of the junction of the bottom seat surface 27 and the bore 29 in order to minimize stresses in the body 13.

Figure 3:
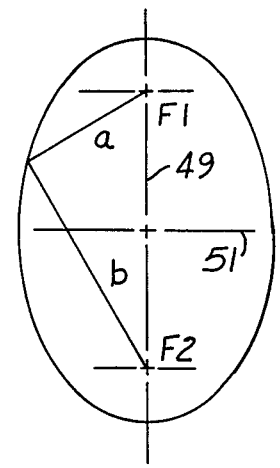
FIG. 3 is an end view of the bore of the wobbler housing shown in FIG. 2 as formed into elliptical shape with the ellipse exaggerated.
Figure 4:
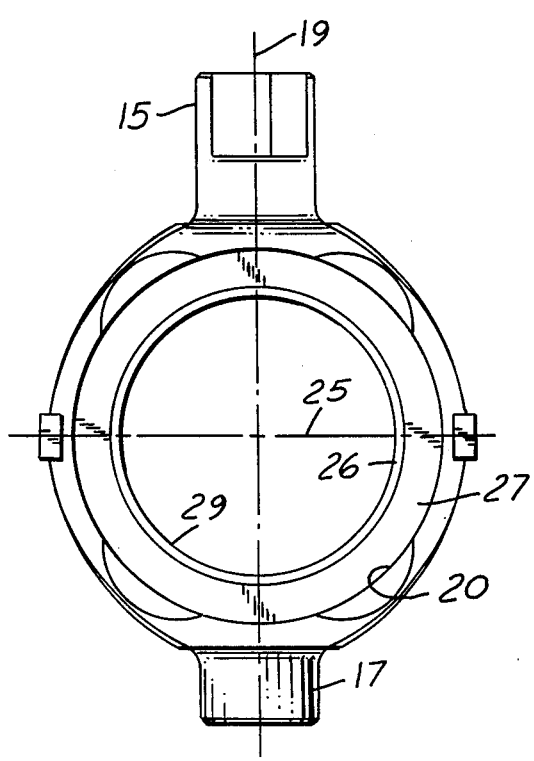
FIG. 4 is a left end view of the machined wobbler housing of FIG. 2.

A successive step includes grinding the bore 29 to an irregular internal shape as at 31 such as of elliptical shape, for illustration with the form of the ellipse exaggerated in FIG. 3 for illustrative purposes only.

The foregoing grinding and turning steps provide the modified flat seat 27, FIG. 2, which has eliminated the irregular surface 21 of the housing 13 shown in FIG. 1.

A further step includes taking a preformed wear plate 33, FIGS. 5 and 6, sometimes referred to as a wear plate insert, having a body 35, a flat control wear face 37 having a flat undersurface 47, a cylindrical shank 39 having an internal bore 41 and an outwardly diverging clearance taper or irregular shape 45.

A further step includes machining or forming the exterior surface of the shank 39 to an irregular shape 45, such as the elliptical shape shown in FIG. 7, which is an exaggerated ellipse for illustrative purposes only.

A further step includes inserting the wear plate body 33 into the machined wobbler housing 13 with the irregular shaped surfaces 31 and 45 being generally elliptical surfaces in nesting registry in order to prevent rotation of the wear plate body 35 relative to the wobbler housing 13.

An additional step includes the securing of the wear plate body 35 within the machined irregular shaped opening 31 of the wobbler housing 13. In the illustrative embodiment, the securing is accomplished by heating the wobbler housing 13 to about 200 degrees F. and press-fitting the wear plate body 35 into the wobbler housing 13 for a shrink fit and anchorage therein upon cooling of the wobbler housing 13. This assembly is shown in FIGS. 8 and 9.

The present method includes an intermediate step after final grinding of the wobbler housing 13, FIGS. 2, of surface-tempering the wobbler housing 13 by baking the machined housing at about 390 degrees F., plus or minus 10 degrees F., for about four hours.

In the illustrative embodiment, and following the preliminary steps of first grinding the worn bottom control face 21, FIG. 1, further turning the ground bottom control face to a preset dimension, and drilling the machined irregular shaped opening, there is provided the intermediate step of final grinding the wobbler face 27 to achieve a predetermined flatness and surface finish to a finalized preset dimension.

In the assembly of the wear plate body 35 into the machined wobbler housing 13, the flat control surface 37 having a flat undersurface 47 defines a mount flange 59 for the shank 39 which bears against the finished machined flat surfaces 27,. After the anchoring of the wear plate body 35 within the wobbler housing 13, there is a further machining step which includes the grinding of the control surface or sealing face 37 upon the wear plate 33 within 0.0001 inch TIR (true indicated reading), with a micro smooth surface finish.

A further and final step includes finish lapping the sealing face 37 to a flatness of about 0.000050 inches, having a surface finish of 8 RMS, approximately.

It is the replacement of the wobbler worn surfaces by the present wear plate body into the machined wobbler housing, the wear plate taking the place of the metal which has been machined from the original wobbler housing to eliminate the wear and irregularities therein. For illustration, bore 41 of the wear plate body 35 corresponds to the original bore 24 of FIG. 1. Clearance taper 43 corresponds to the original clearance taper 23.

In the illustrative embodiment, the elliptical form of the irregular shape 31, which has been machined into the bore 29 of the housing 13 matches and cooperates with a corresponding elliptical form of the irregular shape 45 formed in shank 39. Control surface 37 replaces original control surface 37.

As shown in FIG. 7, the major axis 49 for the exaggerated loop is parallel to the axis 19, and the minor axis 51 of the ellipse 45 is parallel to the right angular axis 25.

The annular chamfer 26 formed within the housing 13, FIG. 8, is arranged at 45 degrees F., for illustration.

There is an annular chamfer 55 on the undersurface 47 of the mount flange 59 shown in FIG. 8 for registry with the corresponding radius 57 machined within the housing 13 as shown in FIG. 2. The radius is in the range of 0.070 to 0.080 inches.

Generally speaking, the present method includes broadly the steps of cutting out worn surface areas of the wobbler, making a wear plate, press-fittinn the wear plate into the wobbler and lapping the wear face or control surface thereof to a flatness of 0.000050 inches with a micro smooth surface finish.

The present method includes the following steps:

grinding the worn bottom control face 21 in a plane parallel to the first axis 19 to a uniform depth;
turning the ground bottom control face to a preset dimension;
drilling a cylindrical bore 29, FIG. 2, in the wobbler housing 13 on a second axis 25 at right angles to first axis 19 to a predetermined diameter which exceeds the maximum diameter of the clearance taper 23 of FIG. 1;
grinding the wobbler face 27 to achieve flatness and surface finish to a final dimension;
grinding an internal elliptical surface 31 into the bore 29 such as shown exaggerated in FIG. 3, sometimes referred to as merely grinding an irregular shape;
taking a preformed wear plate 33, FIG. 5, having a body 35, a flat control surface 37 with a flat undersurface 47, a cylindrical shank 39 having a bore 41 terminating in a diverging clearance taper 43;
forming the exterior surface of the shank 39 to an irregular shape such as elliptical, shown exaggerated at 45, FIG. 7;
baking the machined housing at a temperature of about 390 degrees F., plus or minus 10 degrees F., for a period of about four hours;
coating the pre-manufactured replacement wear plate 33, FIG. 5, with a consistent film of a sealant such as Loc-Tite 620 TM on all internal mating surfaces and allowing the coating to cure;
heating the wobbler housing 13 to about 200 degrees F. and pressfitting the wear plate 33 into the wobbler housing for a shrink fit and anchorage therein on cooling of the wobbler housing;
grinding the control face 37 flat within 0.0001 inch TIR, approximately, with a micro smooth surface finish; and
finish lapping the control face 37 of the body 35 to a flatness of about 0.000050 inches, approximately, with a micro smooth surface finish.

This final lap finishing upon the control surface 37 of the wear plate 33 secured within the machined wobbler housing 13 produces a micron finish necessary for the proper and efficient operation of the wobbler.

A constant-speed drive is a jet engine accessory which turns at a constant speed thus assuring a steady flow of electricity to the aircraft regardless of the speed the engine is running. The wobblers or wobbler plates, except for minor dimensional differences are used with constant speed drives on DC-9, DC-8, 727, 737, 747, DC-10, L-1011 and A-300 aircrafts.

Having described my invention, reference should now be had to the following claims.

I claim:

1. A method of repairing a wobbler housing for a constant-speed drive, said housing being rotatable upon a first axis to a limited extent, with said housing including a bottom normally flat control face which has become worn and irregular in shape and further including an axial bore and tapered shaft clearance opening located upon a second axis which has become worn and out of round, comprising the steps of:
    (a) grinding the worn bottom control face in a plane parallel to said first axis to a uniform depth;
    (b) turning the ground bottom control face to a preset dimension;
    (c) drilling a cylindrical bore in the wobbler housing upon said second axis at right angle to the first axis to a predetermined diameter;
    (d) grinding said cylindrical bore to a preset irregular shape;
    (e) taking a preformed wear plate having a body, a flat control wear face with a opposed flat wearface undersurface, a cylindrical shank, a bore and a clearance taper;
    (f) forming the exterior surface of the shank to a corresponding irregular shape;
    (g) inserting the wear plate body into the machined wobbler housing with the irregular surfaces in registry and with the flat wear face undersurface of said body snugly bearing against the machined bottom face of said housing; and
    (h) securing the wear plate body within the wobbler housing.

2. In the method defined in claim 1 further comprising said irregular shape being elliptical, for preventing rotation of said wear plate body relative to said wobbler housing.

3. In the method defined in claim 2, further comprising the step after grinding an elliptical surface into the bore of the wobbler housing of baking the machined housing at about 390 degrees F., plus or minus 10 degrees F., for about four hours.

4. In the method defined in claim 2, further comprising, in step (g), the elliptical surface of the shank of said body nesting with the corresponding elliptical surface of the bore of said wobbler housing.

5. In the method defined in claim 1, further comprising the step of securing of the wear plate body including heating the wobbler housing to about 200 degrees F., and press-fitting the wear plate body into the wobbler housing for a shrink fit and anchorage on cooling.

6. In the method defined in claim 5, further comprising the step after grinding an elliptical surface into the bore of the wobbler housing of baking the machined housing at about 390 degrees F., plus or minus 10 degrees F., for about four hours.

7. In the method defined in claim 1, further comprising the step after grinding an irregular surface into the bore of the wobbler housing:
(h) baking the machined housing at about 390 degrees F., plus or minus 10 degrees F., for about four hours.

8. In the method defined in claim 1, further comprising the step of grinding the control wear face of said wear body flat within 0.0001 TIR.

9. In the method defined in claim 8, further comprising the step of finish lapping the control face of said body to a flatness of 0.000050 inches, approximately.

10. In the method defined in claim 1, further comprising an intermediate step after step (f) of coating the premanufactured replacement wear plate body with a thin film of a sealant on all internal mating surfaces of a uniform thickness and the further step of allowing the sealant to cure.

11. In the method defined in claim 10, further comprising said sealant being Loc-Tite 620 TM.

12. In the method defined in claim 1, further comprising the shank of said wear plate body having an annular mount flange of uniform predetermined thickness which corresponds to the thickness of the metal removed from the wobbler housing in accordance with steps (a) and (b).

13. In the method of claim 12, further comprising the dimensions of said wear plate shank, bore and clearance taper being predetermined, with said wear plate cylindrical shank replacing the metal removed from the housing in accordance with step (c).

14. In the method defined in claim 1, further comprising the dimensions of said wear plate cylindrical shank, bore and clearance taper being predetermined, with said wear plate cylindrical shank replacing the metal removed from the housing in accordance with step (c).

15. In the method of claim 1, further comprising the intermediate step after step (c) of:
further grinding said bottom control face to a final predetermined dimension for a preset flatness and surface finish.

16. In the method of claim 1, further comprising the intermediate step after step (c) of:
chamfering the inside annular corner of the junction of said bottom control face and bore to minimize stresses in said body.

* * * * *